Sept. 28, 1965  A. W. SCRIBNER  3,208,316

TORQUE LIMITING TOOL

Filed Dec. 16, 1963  2 Sheets-Sheet 1

INVENTOR.
Albert W. Scribner
BY

Sept. 28, 1965         A. W. SCRIBNER              3,208,316
                      TORQUE LIMITING TOOL
Filed Dec. 16, 1963                         2 Sheets-Sheet 2

Albert W. Scribner

United States Patent Office 3,208,316  
Patented Sept. 28, 1965

3,208,316  
TORQUE LIMITING TOOL  
Albert W. Scribner, 6 Country Club Road, Darien, Conn.  
Filed Dec. 16, 1963, Ser. No. 330,973  
1 Claim. (Cl. 81—52.4)

This invention relates to an improved torque limiting hand tool. More particularly the invention relates to a torque limiting screw driver having a novel and more efficient arrangement of parts.

Many prior proposals have been made for torque limiting tools wherein friction discs are pressed together with variable forces so as to yieldably couple the driving and driven members of such tools. Most of these devices have not been entirely satisfactory for several reasons such as costs and/or complexity of parts, non-uniformity of operation; one or more of the parts being physically exposed to contamination by foreign matter and to wear; or because the adjustable setting elements of the tool are not accessible and easily manipulated.

One object of the instant invention is to provide a simple reliable torque limiting tool which is easily settable to various maximum torque limiting values and which is capable of affording a very consistent operation.

Another object of the invention is to provide a low cost torque limiting tool wherein all the friction surfaces and related elements are enclosed and protected from injury and foreign particles from external sources.

Another object of the invention is to provide a torque limiting tool wherein a floating torque transmitting washer is utilized, said washer being rotatable relative to both the driving and driven members of said tool so as to afford a selection of friction interfaces at which slippage may occur at any given time.

A further object of the invention is to provide a novel torque setting testing unit for a torque limiting tool.

Other objects of the invention will become apparent as the disclosure progresses.

In the drawings:

FIG. 1 is an elevational view in partial axial section of one embodiment of the invention.

FIGS. 2 and 3 are sectional views taken along section lines 2—2 and 3—3 respectively of FIG. 1.

FIG. 2a is a front elevational view of the device shown in FIG. 1a.

FIG. 3a is a sectional view taken along section line 3a—3a of FIG. 1a.

Figure 1:
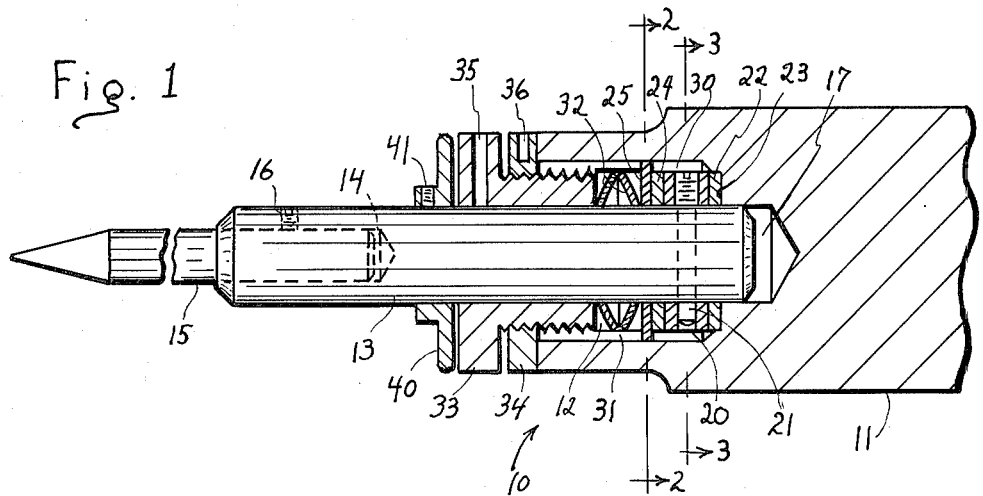
FIG. 1a is a plan view in partial section of a torque setting testing unit.
Figure 2:
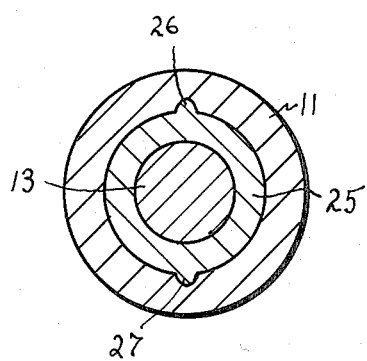
Figure 3:
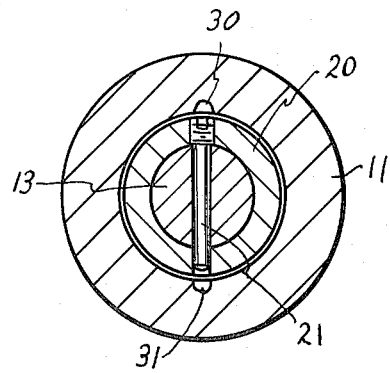

Referring to FIGS. 1–3 there is shown a torque limiting screw driver 10 comprising a handle 11 that is formed at one end thereof with a cylindrical type recess 12. Extending into and through recess 12 is a shaft or shank 13 that is adapted to be frictionally driven by handle 11 as will be described. The outer end of shank 13 is formed with a cylindrical bore 14 which is adapted to receive a screw driver blade member 15 or similar fastener engaging means; the member 15 being secured to shank 13 by means of a suitable set screw 16. The inner end of shank 13 extends into and is rotatably supported in a cylindrical bore 17 formed in the handle 11 at the bottom of and coaxial with the said recess 12.

Figure 4:
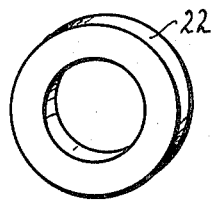
FIG. 4 is a perspective view of one of the floating torque transmitting elements.

An annular collar 20 is fastened to the inner end of shank 13 by means of a pin 21 that extends through diametrally aligned holes formed through the shank and collar. The upper end of pin 21, as seen in FIGS. 1 and 3, threadedly engages the collar so as to fixedly retain collar 12 and shank 13 together as a unit. The opposed annular faces of collar 20 define a pair of frictional working surfaces. An annular floating friction washer or element 22, FIGS. 1 and 4, is carried by shank 13 and is disposed between the collar 20 and the friction surface 23 formed at the bottom of the handle recess 12; the floating washer 22 being rotatable relative to both the handle 11 and the shank 13. A second similar floating friction washer or element 24 is carried by shank 13 and is disposed adjacent the outer side of collar 20; the washer 24 also being rotatable relative to both the handle 11 and shank 13. Disposed next to the outer side of washer 24 is an annular friction disc 25 which is rotatably carried by shank 13 and which is formed with a pair of diametrally opposed keying projections or ears 26 and 27 that are respectively disposed in cooperating longitudinal grooves 30, 31 formed in the recessed portion of handle 11. The respective cross sectional contours of the ears 26 and 27 and the grooves 30, 31 are similar thereby affording an effective splined connection between the handle 11 and disc 25. The disc 25 is thus rotatably secured to handle 11 but is capable of axial movement relative to said handle. As will be apparent the disc 25 in being moved axially of shank 13 may axially compress the washer 24, collar 20, washer 22 against each other and against the annular friction surface 23 formed at the recessed bottom of handle 11. When the parts are so compressed the handle will be frictionally rotatably coupled to the shank 13.

Means are provided for resiliently axially pressing the frictional parts together, said means comprising a pair of dished spring washers 32 and an adjusting collar or hub 33 that threadedly engages the outer recessed end of handle 11, the inner end of hub 33 engaging said spring washers. As will be apparent the rotative adjustment of hub 33 will vary the resilient force with which the friction parts are pressed together and will thus control the maximum amount of torque which may be transmitted through the friction working surfaces of said parts. A threaded lock nut 34 is provided for locking the hub 33 in any given rotative adjusted position relative to handle 11. The hub and lock nut are respectively formed with radial bores 35 and 36 in order to facilitate the rotative manipulation thereof by any suitable pin-like tool. A slip sensing disc 40 is rotatably fixed to shank 13 by any suitable means such as a set screw 41 and is disposed in close proximity to the outer end of hub 33. The functional purpose of disc 40 will be discussed below.

In the operation of the tool 10 the threaded hub 33 is first rotatably set to a desired position and the lock nut 34 is tightened. The shank collar 20 and the floating washers 22 and 24 will then be axially squeezed between the friction surface 23 and the inner friction surface of the disc 25, both of the latter two surfaces being rotatably connected to the driving handle 11. The handle 11 is thus capable of frictionally applying a torque to the shank 13. For any given setting of hub 33 there will be a maximum amount of such torque which may be transmitted to shank 13 from handle 11 during successive uses of the tool. As the effective axial compressing force created between the various friction surfaces is increased and decreased by the tightening and loosening of hub 33 the maximum value of the torque which may be transmitted to said shank will thereby be increased and decreased respectively. If for any setting of hub 33 more than the maximum amount of torque is attempted to be transmitted from the handle to the shank the various mutually engaging friction surfaces of said handle, disc 25, floating washers 22 and 24, and collar 20 may frictionally slip relative to one another and hence under these conditions the handle will rotate relative to the shank 13 and no more than said maximum torque can or will be imposed on shank 13 and the screw or other fastener being tightened. When relative rotative slip movement between the handle and shank does occur this movement may be sensed or felt by the operator whose hand is turning the handle 11. Here one of the fingers of said operator's hand may remain extended so as to touch the knurled periphery of the slip sensing disc 40 that is attached to said shank 13 whereby the operator will immediately become aware of said relative movement as soon as it occurs by sensing the resulting finger slippage on the disc periphery. The operator is thus advised of the fact that the predetermined maximum torque transmitttable has been reached.

With a construction of the torque limiting tool as described above all the friction surfaces and related parts are enclosed within the recess 12 and will thus be protected from external impact, contact, or foreign particles that could contaminate the friction working surfaces of the tool.

Figure 5:
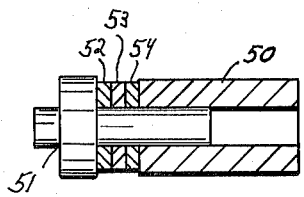
FIG. 5 is an axial sectional view of a schematic arrangement of parts that illustrates the nature of operation of the floating torque transmitting elements of the instant tool.
Figure 1A:
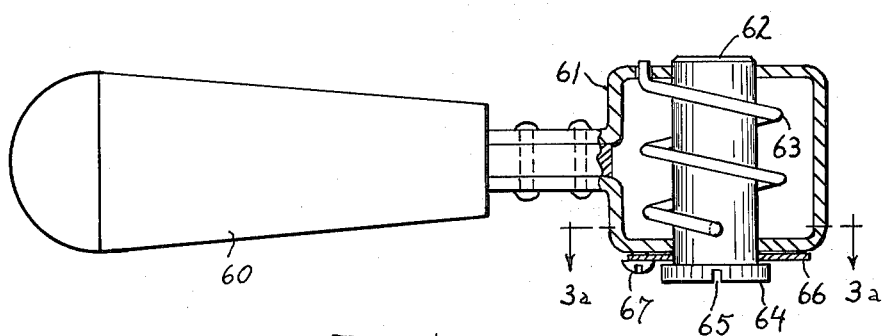
Figure 2A:
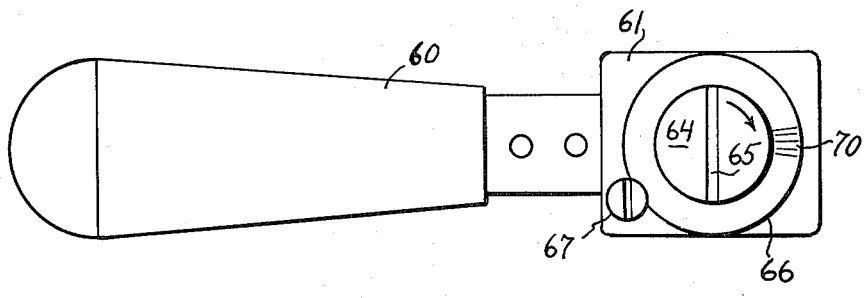
Figure 3A:
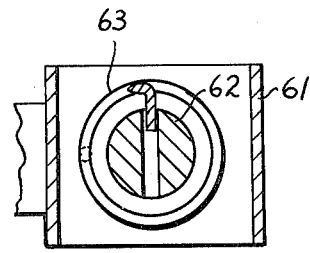

It will be noted that the floating washer 22 has opposed annular frictional surfaces and that slippage may take place at either or both of these opposed surfaces at a given time during operation of the tool. The same applies to washer 24. This selective slippage capability has a tendency to make more uniform the maximum torque which will be successively transmittable to the shank 13 during extended periods of use of the screw driver and while hub 33 has a particular setting. The nature of this slippage at selective interfaces will be discussed in connection with the diagrammatic sketch of FIG. 5 wherein a tubular driving member 50 is adapted to frictionally rotate a flanged shaft 51 through several floating friction washers such as 52, 53 and 54 which are carried by shaft 51 but which are rotatable relative to both the shaft 51 and the driving member 50. For a given axial force between the friction surfaces of the parts it will be seen that when the maximum torque has been applied to the driving member 50 slippage may occur at any of the various frictional interfaces located between the left end face of member 50 and the right hand annular flange face of the driven shaft 51. This slippage will always occur between those frictional surfaces offering at any given time the least torsional resistance, and may occur at one or more of said interfaces at any such given time and hence always tends to minimize the fluctuations in maximum torque transmitting capability of the unit. In the same manner the floating washers 22 and 24 of the tool 10 provide multiple separate friction surfaces at which slippage may selectively occur in accordance with the location of the weakest frictional link in the torque chain whereby for any given setting of hub 33 there will be a very uniform predictable maximum torque which may be applied to the shank 13 by handle 11 during successive uses of the tool.

The material used for the two faces defining a friction interface are different; the floating washers 22 and 24 being of a porous cuprous material while the material defining the remaining friction surfaces is made of mild steel.

FIGS. 1a–3a show a tool for testing the maximum torque capability for the torque limiting screw driver 10 of FIG. 1. Here a handle 60 is connected to a rectangular frame 61 that rotatably supports a shaft 62. The opposite ends of a torsional spring 63 are operatively secured to the frame 61 and the shaft 62 respectively so as to retain the shaft in the frame and to yieldably resist the rotative movement of the shaft relative to the frame. The headed outer end 64 of shaft 62 is provided with a diametral slot 65 or other suitable means so as to receive the operative end of the screw driver or other torque limiting tool bit. An annular disc 66 rotatably carried by shaft 62 is disposed between the frame 61 and the shaft head 64 and may be rotatably locked relative to frame 61 by means of a screw 67 that threadedly engages the frame and has a head which is adapted to clamp a peripheral portion of the disc 66 against the said frame. The periphery of the disc is provided with an indicia field 70.

In use of the above described testing tool the locking screw 67 is loosened and a screw driver which is known to be properly set for a desired maximum torque is used to rotate shaft 62 relative to frame 61. When the maximum possible rotative deflection of slot 65 has been effected by said properly set screw driver the disc 66 is rotatably positioned so that the end of slot 65 lies approximately in the center of said indicia field 70. The applied torque load on shaft 62 is then removed and the lock screw 67 is tightened. After an extended period of use of the screw driver the latter may be checked to see if it is still properly adjusted for the same maximum torque by simply testing to determine if the screw driver can still rotate said shaft 62 to a point such that the slot 65 is within the acceptable range denoted by the limits of said indicia field 70. If the shaft rotation does not fall within this acceptable range then the screw driver needs adjustment and here the hub 33 may be appropriately rotatably positioned to bring the maximum operational torque back to the desired value.

As will be apparent the driving member or handle 11 of the tool 10 may be defined by an element that is power driven.

While only one embodiment of the invention has been shown and described, it will be apparent to those skilled in the art that numerous variations and modifications may be made in the particular construction without departing from the underlying principles of the invention. It is therefore desired, by the following claims, to include within the scope of the invention all such variations and modifications whereby substantially the results of the invention may be obtained by the use of substantially the same or equivalent means.

The invention claimed is:

A torque limiting hand tool: comprising
  a handle, the forward portion of said handle having an axially disposed recess formed therein, the inner end of said recess being formed with an operative working shoulder having a surface that effectively defines the bottom portion of said recess;
  an elongated shank extending through said recess, the inner end of said shank being disposed adjacent the bottom of said recess;
  a cylindrical collar secured to said shank and being disposed near the bottom of said recess;
  a first floating ring rotatably mounted on said shank and being operatively disposed between said working shoulder surface of the bottom of said recess and the adjacent face of said collar, said first floating ring being operatively rotatable relative to said handle as well as said shank;
  a keying washer disposed in said recess and being keyed to said handle;
  a second floating ring rotatably mounted on said shank on the opposite side of said cylindrical collar from said first floating ring and being operatively disposed between said keying washer and the other adjacent face of said cylindrical collar, said second floating ring being operatively rotatable relative to said handle as well as said shank;

an adjusting collar rotatably mounted on said shank and having a threaded inner end that is threadingly secured to the outer end of the said recess in said handle;

locking means for effectively locking said adjustment collar relative to said handle;

spring means disposed in said recess and being operatively disposed between the inner end of said adjusting collar and the outer face of said keying washer, whereby for a given setting of said adjusting collar the predetermined maximum torque then transmittable from said handle to said shank will cause a relative rotative movement to selectively occur over that face of each of said floating rings which can at that time transmit the least amount of rotative torque, there then being no relative movement between the respective opposite faces of said floating rings and the torque transmitting surfaces that said opposite faces respectively contact; and a tool bit secured to the outer end of said shank.

References Cited by the Examiner

UNITED STATES PATENTS

| | | | |
|---|---|---|---|
| 2,333,980 | 11/43 | Branson | 64—30 |
| 2,593,907 | 4/52 | Marshall | 81—52.4 X |
| 2,606,431 | 8/52 | Elgin | 81—52.4 X |
| 2,708,836 | 5/55 | Stuart | 81—52.4 X |
| 2,503,649 | 4/58 | Zimmerman | 73—1 |
| 2,945,374 | 7/60 | Simmons | 73—1 |
| 2,984,133 | 5/61 | Livermont | 81—52.4 |
| 3,001,430 | 9/61 | Cranford | 81—52.4 |

FOREIGN PATENTS

| | | |
|---|---|---|
| 488,748 | 12/52 | Canada. |
| 1,043,410 | 6/53 | France. |

WILLIAM FELDMAN, *Primary Examiner.*

MILTON S. MEHR, *Examiner.*